United States Patent
Chen

(10) Patent No.: US 10,512,836 B2
(45) Date of Patent: Dec. 24, 2019

(54) INTERACTIVE SYSTEM BASED ON LIGHT INTENSITY RECOGNITION

(71) Applicant: FUJIAN BLUE HAT INTERACTIVE ENTERTAINMENT TECHNOLOGY LTD., Xiamen (CN)

(72) Inventor: Xiaodong Chen, Xiamen (CN)

(73) Assignee: FUJIAN BLUE HAT INTERACTIVE ENTERTAINMENT TECHNOLOGY LTD., Xiamen (CN)

( * ) Notice: Subject to any disclaimer, the term of this patent is extended or adjusted under 35 U.S.C. 154(b) by 0 days.

(21) Appl. No.: 16/072,736

(22) PCT Filed: Oct. 20, 2016

(86) PCT No.: PCT/CN2016/102655
§ 371 (c)(1),
(2) Date: Jul. 25, 2018

(87) PCT Pub. No.: WO2018/006509
PCT Pub. Date: Jan. 11, 2018

(65) Prior Publication Data
US 2019/0030424 A1 Jan. 31, 2019

(30) Foreign Application Priority Data
Jul. 5, 2016 (CN) .................... 2016 2 0700673 U

(51) Int. Cl.
*A63H 33/22* (2006.01)
*A63F 13/23* (2014.01)
(Continued)

(52) U.S. Cl.
CPC .......... *A63F 13/23* (2014.09); *A63F 13/2145* (2014.09); *A63H 33/26* (2013.01)

(58) Field of Classification Search
CPC ......... A63F 2250/87; A63F 2009/2419; A63H 2200/00; A63H 33/22
See application file for complete search history.

(56) References Cited

U.S. PATENT DOCUMENTS 2,947,879 A * 8/1960 Henle .................. H03K 19/013
327/392
5,853,327 A * 12/1998 Gilboa ................ A63F 3/00643
463/39

(Continued)

FOREIGN PATENT DOCUMENTS

| CN | 102089045 A | 6/2011 |
|---|---|---|
| CN | 102671372 A | 9/2012 |

(Continued)

OTHER PUBLICATIONS

"App Note: Discrete driver circuits for vibration motors" by DP. Published Sunday, May 10, 2015. Source://www.dangerousprototypes. conn/blog/2015/05/10/app-note-discrete-driver-circuits-for-vibration-motors/.*

(Continued)

*Primary Examiner* — Steven J Hylinski
(74) *Attorney, Agent, or Firm* — Cooper Legal Group, LLC

(57) ABSTRACT

An interactive system based on light ray intensity recognition includes a smart device and a toy. The smart device has a touch control display screen providing variable brightness display. The toy is fitted onto the touch control screen and a light ray detection circuit is mounted on the bottom of the toy. The toy includes an LED drive circuit and an electromagnetic coil drive circuit; the output of the light ray detection circuit is respectively connected to an input of the LED drive circuit and an input of the electromagnetic coil drive circuit, the light ray detection circuit implementing detection of a brightness signal of the display picture of the (Continued)

touch control display screen of the smart device and outputting a drive signal, such that the LED drive circuit drives an LED to light up, switch off, or flash, and the electromagnetic coil drive circuit drives the toy to vibrate.

20 Claims, 4 Drawing Sheets

(51) Int. Cl.
*A63F 13/2145* (2014.01)
*A63H 33/26* (2006.01)

(56) References Cited

U.S. PATENT DOCUMENTS

| | | | | |
|---|---|---|---|---|
| 6,443,796 | B1 * | 9/2002 | Shackelford | A63H 33/042 |
| | | | | 273/237 |
| 6,952,196 | B2 * | 10/2005 | Weil | G06F 3/002 |
| | | | | 345/156 |
| 8,684,806 | B2 * | 4/2014 | Mineur | A63F 3/00643 |
| | | | | 345/173 |
| 8,702,512 | B2 * | 4/2014 | Mineur | A63F 3/00643 |
| | | | | 345/173 |
| 10,188,939 | B2 * | 1/2019 | Zhang | A63F 13/235 |
| 2002/0077028 | A1 * | 6/2002 | Nishimoto | A63H 30/04 |
| | | | | 446/484 |
| 2002/0081937 | A1 * | 6/2002 | Yamada | A63H 3/48 |
| | | | | 446/175 |
| 2002/0107591 | A1 * | 8/2002 | Gabai | A63H 3/28 |
| | | | | 700/94 |
| 2004/0000713 | A1 * | 1/2004 | Yamashita | A61B 5/0002 |
| | | | | 257/728 |
| 2004/0072498 | A1 * | 4/2004 | Yeon | A63H 30/02 |
| | | | | 446/297 |
| 2007/0128979 | A1 * | 6/2007 | Shackelford | A63H 3/001 |
| | | | | 446/484 |
| 2012/0212427 | A1 * | 8/2012 | Li | G06F 3/0488 |
| | | | | 345/173 |
| 2013/0012313 | A1 | 1/2013 | Chen | |
| 2013/0040530 | A1 * | 2/2013 | Matsuno | A63H 3/28 |
| | | | | 446/73 |
| 2013/0288560 | A1 * | 10/2013 | Abou-Hamda | A63H 33/005 |
| | | | | 446/175 |
| 2013/0310956 | A1 * | 11/2013 | Rehkemper | G05D 1/0234 |
| | | | | 700/83 |
| 2013/0324241 | A1 * | 12/2013 | Elliott | A63F 13/90 |
| | | | | 463/31 |
| 2014/0024287 | A1 * | 1/2014 | Mineur | A63F 3/00643 |
| | | | | 446/484 |
| 2014/0051513 | A1 * | 2/2014 | Polo | A63F 13/00 |
| | | | | 463/31 |
| 2014/0349547 | A1 * | 11/2014 | Fife | A63H 30/04 |
| | | | | 446/353 |
| 2016/0314609 | A1 * | 10/2016 | Taylor | G06T 13/40 |
| 2016/0323969 | A1 * | 11/2016 | Aliakseyeu | A63H 33/42 |

FOREIGN PATENT DOCUMENTS

| | | | | |
|---|---|---|---|---|
| CN | 103083906 A | | 5/2013 | |
| CN | 103877727 A | | 6/2014 | |
| CN | 105080148 A | | 11/2015 | |
| JP | 2006198341 A | | 8/2006 | |
| WO | WO-2014139092 A1 | | 9/2014 | |
| WO | WO-2015083302 A1 | * | 6/2015 | A63H 13/005 |

OTHER PUBLICATIONS

"Dark sensor using transistor, phototransistor and photodiode", published May 6, 2012. source:https://www.buildcircuit.com/dark-sensor-using-transistor-phototransistor-and-photodiode/.*

* cited by examiner

INTERACTIVE SYSTEM BASED ON LIGHT INTENSITY RECOGNITION

TECHNICAL FIELD

The invention relates to the technical field of toys, and particularly to an interactive system based on light intensity recognition.

BACKGROUND TECHNIQUE

With the development of electronic technology, a variety of infant toys have emerged that can help children improve their cognitive level and play a role in edutainment. For example, an infant toy with a photoelectric effect can be used to brighten, extinguish, flicker or vibrate toys to achieve the purpose of providing play to young children. On the other hand, with the continuous progress of smart devices such as mobile phones or tablet computers, how to combine smart devices with toys to form interactions between smart devices and toys has become a problem that people need to solve further. In the earlier technology, the connection between the toy and the smart device was through a wired connection, that is, the toy and the smart device were connected by a plug-in line. The smart device used the control command generated in the game program to control the toy by running the game program, so that various kinds of game programs can be run to cause the toy to have various different operating states. However, such a wired connection requires a line connection, which causes inconvenience in carrying, affects appearance, and it is inconvenient for the play of toys. In the prior art, a wireless communication module is set in a toy. Between the smart device and the toy, a control command generated by a game program of the smart device is transmitted to the toy through a wireless communication module, thereby controlling the action state of the toy, as disclosed in Chinese Patent Application Publication No. CN105080148A. Whether it is a wired transmission control command or a wireless transmission control command, toys have failed to effectively integrate with smart devices to achieve interaction.

SUMMARY OF THE INVENTION

In order to solve the technical problems existing in the prior art, the present invention provides an interactive system based on light intensity recognition. By installing a light sensor on a toy, a game program is run on the smart device to provide a control signal of brightness change. After collecting by the light sensor, the movement of the toy is controlled, thereby realizing the effective interaction between the smart device and the physical toy, and it has the characteristics of simple circuit structure, low manufacturing cost, and easy realization.

The technical solution adopted by the present invention to solve the above technical problems is:

Provides an interactive system based on light intensity recognition, including:

a smart device having a touch display screen for interacting with a toy and a corresponding program preset in the smart device that enables the touch display screen to display brightness changes; and a toy which is adapted to the touch display screen of the smart device, a light sensor for detecting the brightness change of the touch display screen of the smart device is mounted on the bottom of the toy, and the light sensor includes a light detection circuit; a LED driving circuit and a solenoid driving circuit are also included in the toy; the output of the light detection circuit is connected to the input of the LED driving circuit and the input of the solenoid driving circuit respectively. The light detection circuit send a driving signal to the LED driving circuit and the electromagnetic coil driving circuit by detecting the brightness signal of the display frame of the touch display screen of the smart device, so that the LED driving circuit drives the LED of the toy to turn on, turn off or blink, and the electromagnetic coil driving circuit drives the toy to vibrate.

As a preferred solution of the present invention, the light detecting circuit includes a photodiode D1, a first resistor R1, a second resistor R2, and a first transistor Q1. The cathode of the photodiode D1 is connected to the first power source VCC. The anode of photodiode D1 is grounded through the first resistor R1; the common end of the photodiode D1 and the first resistor R1 is connected to the base of the first transistor Q1; the emitter of the first transistor Q1 is grounded. The collector of a transistor Q1 is respectively connected to one end of the second resistor R2, the input end of the LED driving circuit, and the input end of the solenoid driving circuit; the other end of the second resistor R2 is connected to the first power supply VCC.

As a preferred solution of the present invention, the LED driving circuit includes a second transistor Q2, a third resistor R3 and a light emitting diode LED1; a base of the second transistor Q2 is connected to the output end of the light detecting circuit. The emitter of the second transistor Q2 is grounded, and the collector of the second transistor Q2 is connected to the cathode of the light emitting diode LED1 through the third resistor R3; the anode of the light emitting diode LED1 is connected to the first power supply VCC.

As a preferred solution of the present invention, the electromagnetic coil driving circuit includes a MOS transistor Q3 and a electromagnetic coil L; the gate of the MOS transistor Q3 is connected to the output end of the light detection circuit, and the source of the MOS transistor Q3 is grounded. The drain of the tube Q3 is connected to the positive electrode of the electromagnetic coil L; the negative electrode of the electromagnetic coil L is connected to the first power source VCC.

As a preferred solution of the present invention, the electromagnetic coil driving circuit further includes a capacitor C1. The capacitor C1 is connected between the first power source VCC and the ground.

As a preferred solution of the present invention, the light detecting circuit further includes a fourth resistor R4, a fifth resistor R5, and a fourth transistor Q4; the fourth resistor R4 and the fifth resistor R5 are connected in series to between the positive and the negative electrodes of the second power source, the common terminal of the fourth resistor R4 and the fifth resistor R5 is connected to the base of the fourth transistor Q4; the collector of the fourth transistor Q4 is connected to the photodiode D1. And the emitter of the fourth transistor Q4 is connected to the first power source VCC.

As a preferred solution of the present invention, the first transistor Q1 is an NPN transistor As a preferred embodiment of the present invention, the second transistor Q2 is an NPN transistor.

As a preferred solution of the present invention, the MOS transistor Q3 is an N-type MOS transistor.

As a preferred solution of the present invention, the fourth transistor Q4 is a PNP type transistor.

With the above technical solution, compared with the prior art, the beneficial effects obtained by the present invention are:

1. Due to the use of a light sensor installed on the toy, using the light sensor of the toy to collect the brightness change signal provided by the running program on the smart device, and then control the action of the toy, that is, according to the recognized brightness change of the touch display screen of the smart device to drive the LED to turn on, turn off, or blink, or vibrate, thereby enabling effective interaction between the smart device and the physical toy.

2. Since the toy is provided with a light detection circuit, an LED driving circuit input, and a solenoid driving circuit to control the toy motion, the output of the light detection circuit is directly used as a driving signal for the LED driving circuit and the solenoid driving circuit. It has the advantages of simple circuit structure, low manufacturing cost and easy implementation.

DETAILED DESCRIPTION

The technical solutions described in the present invention will be described in detail below with reference to the accompanying drawings and an embodiment.

Embodiment

Figure 1:
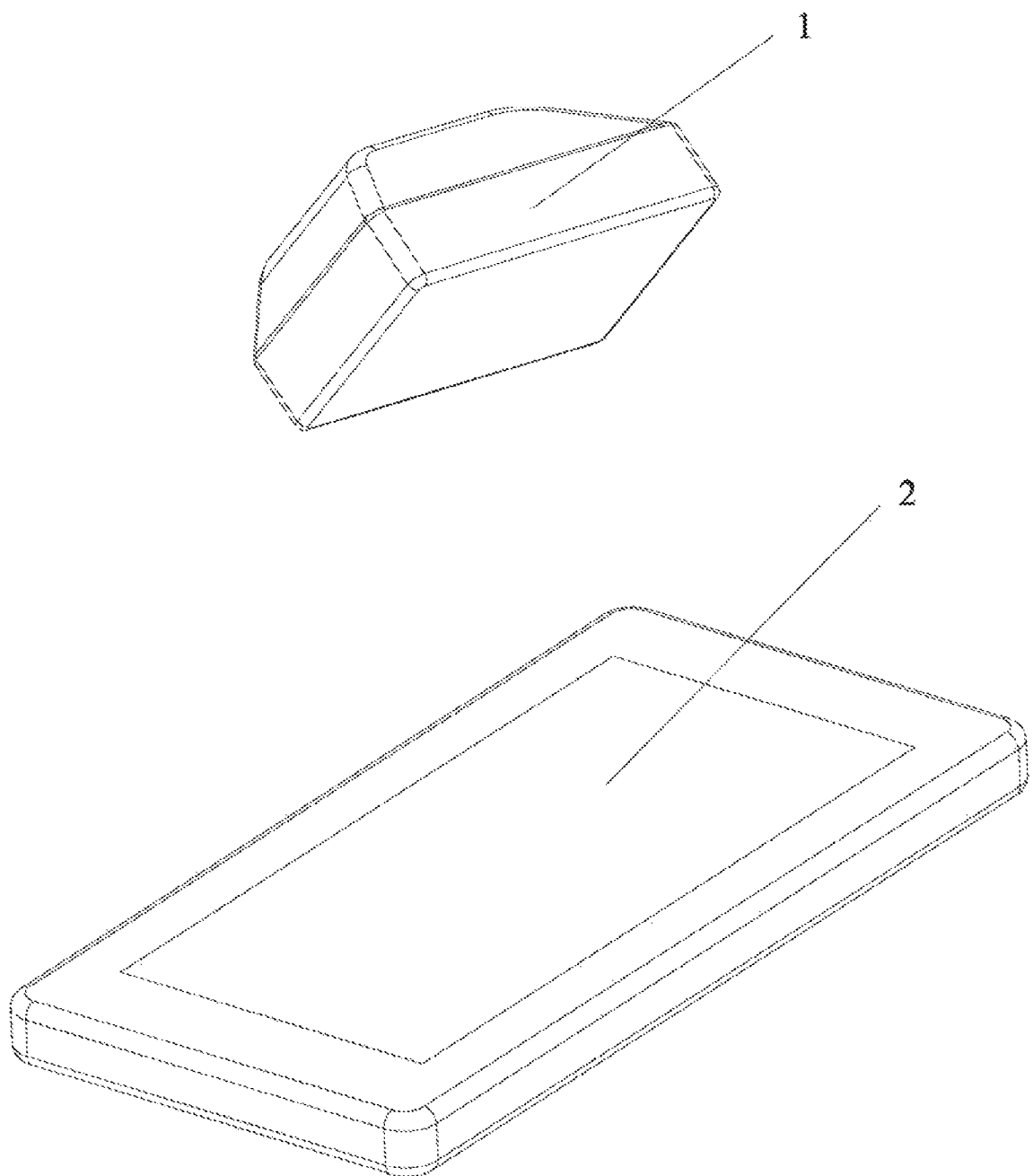
FIG. 1 is a schematic structural view of the toy and the smart device according to the embodiment of the present invention.
Figure 2:
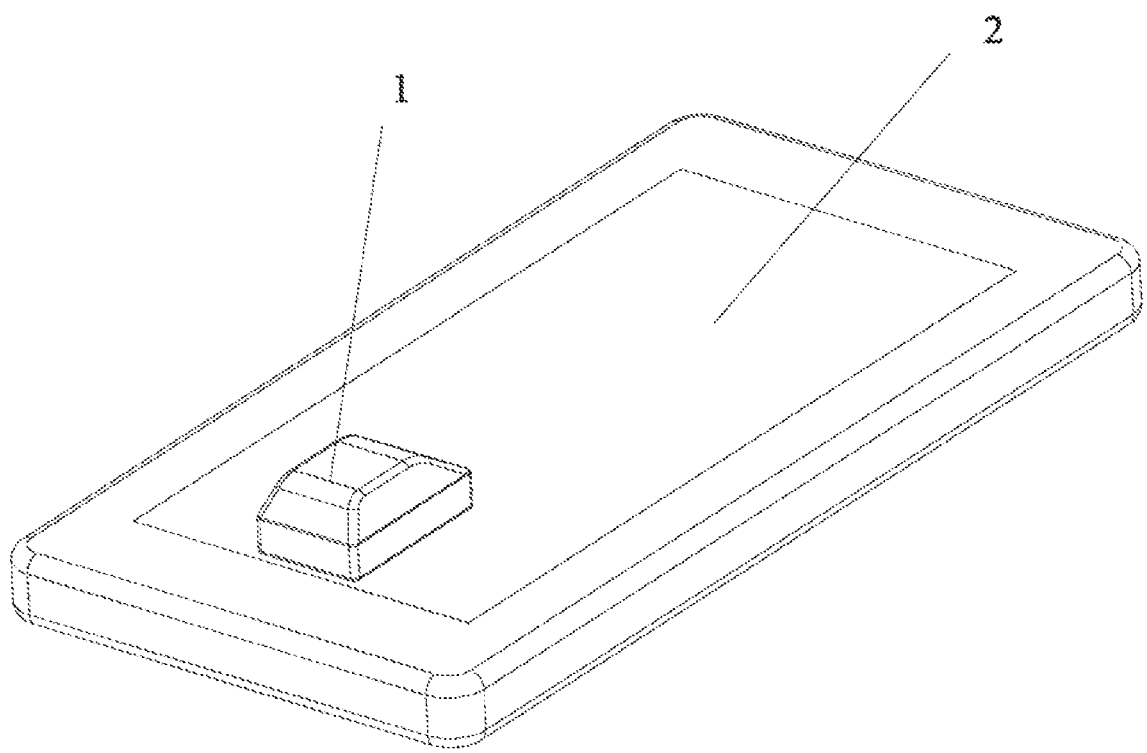
FIG. 2 is a schematic structural view of the embodiment of the toy of the present invention placed on the smart device.
Figure 3:
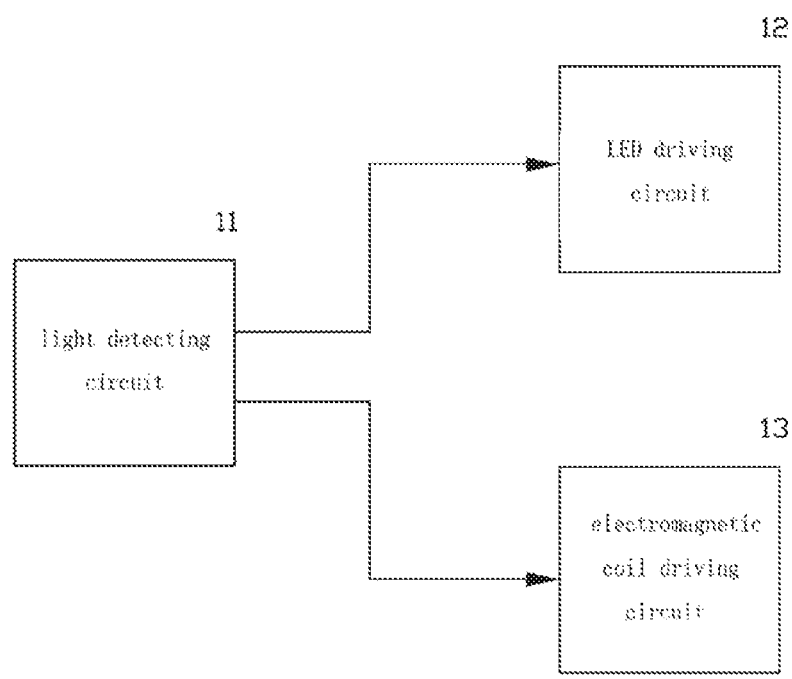
FIG. 3 is a circuit block diagram of the embodiment of the toy of the present invention.
Figure 4:
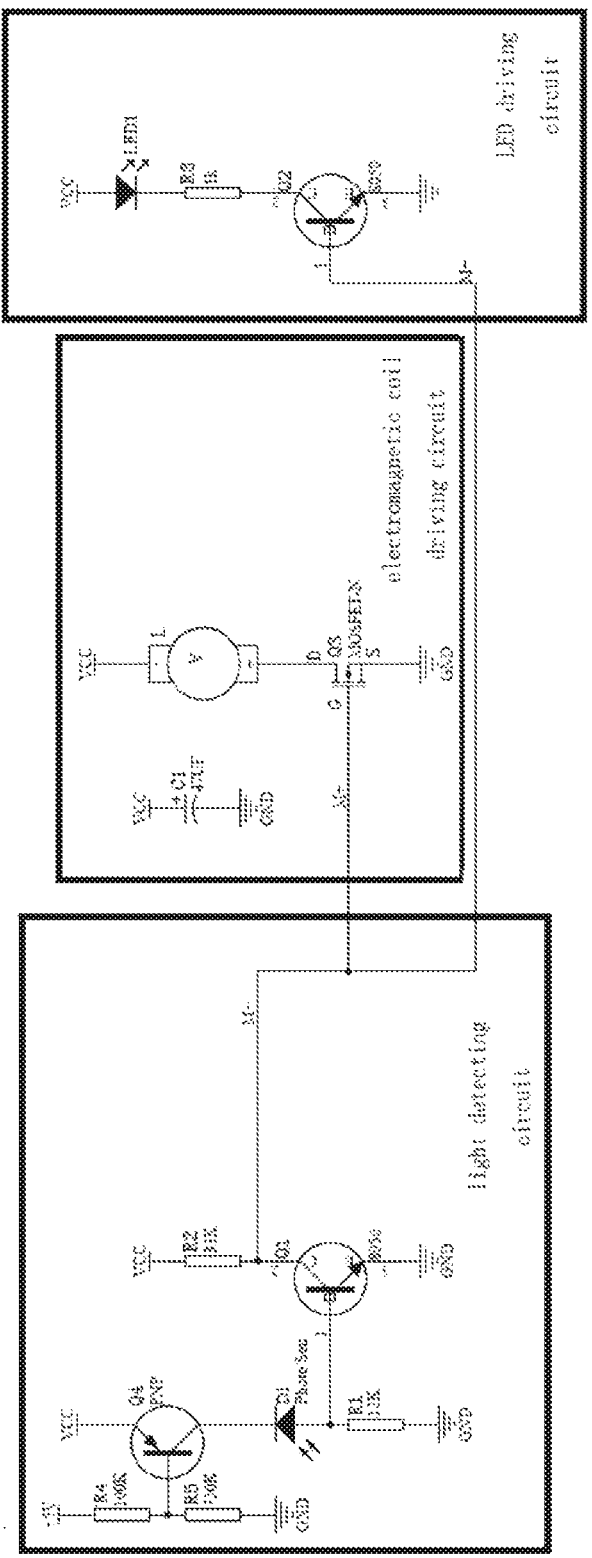
FIG. 4 is a circuit diagram of the embodiment of the toy of the present invention.

Referring to FIG. 1 to FIG. 3, an interactive system based on light intensity recognition of the present invention includes:

a smart device 2 having a touch display screen for interacting with a toy and a corresponding program preset in the smart device to enable the touch display screen to display brightness changes; and a toy 1.

The toy 1 is fitted on a touch display screen of the smart device 2. At the bottom of the toy 1, is provided with a light sensor for detecting the brightness change of the touch display screen of the smart device. The light sensor includes light detection circuit 11; The toy 1 further includes an LED driving circuit 12 and a solenoid driving circuit 13; the outputs of the light detection circuit 11 are connected to the input of the LED driving circuit 12 and the input of the solenoid driving circuit 13 respectively, and the light detection circuit 11 send the driving signal to the LED driving circuit 12 and the solenoid driving circuit 13 by detecting the brightness signal of the display screen of the touch screen of the smart device, so that the LED driving circuit 12 drives the LED of the toy to turn on, turn off, blink to make the electromagnetic coil driving circuit 13 drives the toy 1 to vibrate.

The light detecting circuit 11 includes a photodiode D1, a first resistor R1, a second resistor R2, and a first transistor Q1. The cathode of the photodiode D1 is connected to the first power source VCC, and the anode is grounded through the first resistor R1. The common terminal of the diode D1 and the first resistor R1 is connected to the base of the first transistor Q1 through a wire; the emitter of the first transistor Q1 is grounded, and the collector of the first transistor Q1 respectively is connected to one end of the second resistor R2, the input end of the LED driving circuit and the input end of the electromagnetic coil driving circuit, and the other end of the second resistor R2 is connected to the first power supply VCC. The working principle of the light detection circuit is that: the photodiode D1 and the resistor R1 form a voltage divider circuit, when the touch display screen of the smart device has light or the light reaches a certain brightness (it can also set the threshold value), the NPN type transistor Q1 conducts, and the position of M+ is low level; when the smart device's touch display screen has no light or the light is less than a certain brightness (i.e., the threshold is set), the NPN transistor Q1 is turned off, and the position of the M+ point is high Level.

The LED driving circuit 12 includes a second transistor Q2, a third resistor R3, and a light emitting diode LED1. The base of the second transistor Q2 is connected to the output end of the light detecting circuit, and the emitter of the second transistor Q2 is grounded, and the collector of the second transistor Q2 is connected to the cathode of the light emitting diode LED1 through the third resistor R3; the anode of the light emitting diode LED1 is connected to the first power source VCC. The operating principle of the LED driving circuit is as follows: if M+ is high level, the NPN type transistor Q2 is turned on and the LED is bright; if M+ is low level, the transistor Q2 is turned off and the LED is off; if the level of M+ continues to jump (change between high and low levels), the LED flashes.

The solenoid driving circuit 13 includes a MOS transistor Q3 and a solenoid L; the gate of the MOS transistor Q3 is connected to the output end of the light detection circuit, the source of the MOS transistor Q3 is grounded, and the drain of the MOS transistor Q3 is connected to the positive pole of the solenoid L; the negative pole of the electromagnetic coil L is connected to the first power source VCC. The operating principle of the electromagnetic coil driving circuit is as follows: if M+ is high level, the N-type MOS transistor Q3 is turned on, so that the coil starts to work; if M+ is low level, the MOS transistor Q3 is cut off and the coil does not work; if the level of M+ continues to jump (changes between high and low levels), and the coil jitters, which in turn drives the entire toy.

The solenoid driving circuit 13 further includes a capacitor C1 that is connected between the first power source VCC and the ground. Since the voltage is reduced when the coil is operated, the capacitor C1 plays a protective role.

Further, the light detecting circuit 11 further includes a fourth resistor R4, a fifth resistor R5, and a fourth transistor Q4; the fourth resistor R4 and the fifth resistor R5 are connected in series to a second power source (i.e., a 5V power supply) between the positive and negative ends of the positive and negative electrodes, the common terminal of the fourth resistor R4 and the fifth resistor R5 is connected to the base of the fourth transistor Q4 through a wire; the collector connection of the fourth transistor Q4 is connected to the cathode of the photodiode D1, the anode of the photodiode D1 is grounded through the first resistor R1; the emitter of the fourth transistor Q4 is connected to the first power source VCC. The function of this circuit is to use the PNP type transistor Q4 to control the power of the toy when the toy is charged, so that the toy cannot work when charging.

In summary, the present invention is to install a light sensor on a toy and use the light sensor of the toy to collect the brightness change signal provided by the running program on the smart device. The smart device can be a mobile phone or a tablet computer, and then controlling the toy, that is, driving the LED to perform lighting, extinguishing, or blinking or driving the vibration of the toy according to the change of the brightness of the touch screen of the recognized smart device, thereby achieving effective interaction between the smart device and the physical toy. The invention sets a light detection circuit, an input of the LED driving circuit and a solenoid driving circuit on the toy to control the motion of the toy, and directly uses the output of the light detection circuit as the drive signal of the LED driving circuit and the electromagnetic coil driving circuit. It has the characteristic of simple structure, low production cost and easy implementation.

The foregoing descriptions are merely preferred embodiment of the present invention, so the scope of the present invention is not limited thereto. That is, the equivalent changes and modifications made according to the scope of the patent application of the present invention and the content of the description shall still belong to the patent coverage of the present invention.

INDUSTRIAL APPLICABILITY

The present invention is an interactive system composed of a smart device and a toy. The smart device can be an existing mobile phone or tablet computer and the like, and has been realized in the industry, and the corresponding programs for changing the brightness preset in the smart device are also easily implemented in the industry. The toy that interacts with the smart device uses the light detection circuit to collect the signal of the brightness change of the touch display of the smart device, and directly realizes the output of the light detection circuit as the drive signal of the LED driving circuit and the electromagnetic coil driving circuit. The effective interaction between the smart device and the physical toy; the light detection circuit, the LED driving circuit and the electromagnetic coil driving circuit of the present invention adopts common electronic components such as a photodiode, a resistor, a transistor, a light emitting diode, a MOS transistor, a capacitor and a solenoid. The present invention is industrially easy to implement, and a light detection circuit made of a photodiode, a resistor, a transistor, a light emitting diode, an MOS transistor, a capacitor, and an electromagnetic coil, an LED driving circuit, and a solenoid driving circuit are also easy to process in industry.

The invention claimed is:

1. An interactive system based on light intensity recognition, comprising:
   a toy; and
   a smart device having a touch display screen for interacting with the toy and a corresponding program preset in the smart device that makes the touch display screen display a brightness change, wherein
   the toy is adapted to the touch display screen of the smart device,
   a light sensor is disposed on a bottom end of the toy for identifying a brightness change of the touch display screen of the smart device,
   the light sensor comprises a light detection circuit,
   the toy comprises a light emitting diode (LED) driving circuit and an electromagnetic coil driving circuit,
   an output of the light detection circuit is connected to an input of the LED driving circuit and an input of the electromagnetic coil driving circuit respectively,
   the light detection circuit sends a drive signal to the LED driving circuit and the electromagnetic coil driving circuit by detecting a brightness signal of the touch display screen of the smart device so that the LED driving circuit drives an LED of the toy to turn on, turn off or blink and the electromagnetic coil driving circuit drives the toy to vibrate as a whole,
   the light detection circuit comprises a photodiode, a first resistor, a second resistor and a first transistor,
   a cathode of the photodiode is connected to a first power source,
   an anode of the photodiode is grounded through the first resistor,
   a common terminal of the photodiode and the first resistor is connected to a base of the first transistor,
   an emitter of the first transistor is grounded,
   a collector of the first transistor is connected to a first end of the second resistor, the input of the LED driving circuit, and the input of the electromagnetic coil driving circuit,
   a second end of the second resistor is connected to the first power source,
   the photodiode and the first resistor form a voltage divider circuit,
   when a light of the touch display screen reaches a specified brightness, the first transistor conducts and a signal output at the output of the light detection circuit is a first level,
   when the light of the touch display screen is less than the specified brightness, the first transistor is turned off and the signal output at the output of the light detection circuit is a second level that is higher than the first level,
   the electromagnetic coil driving circuit comprises a metal-oxide semiconductor (MOS) transistor and an electromagnetic coil,
   a gate of the MOS transistor is connected with the output of the light detection circuit,
   a source of the MOS transistor is grounded,
   a drain of the MOS transistor is connected to an anode of the electromagnetic coil,
   a cathode of the electromagnetic coil is connected to the first power source,
   when the signal output at the output of the light detection circuit is the second level, the MOS transistor is turned on so that the electromagnetic coil starts to work,
   when the signal output at the output of the light detection circuit is the first level, the MOS transistor is turned off and the electromagnetic coil does not work, and
   when the signal output at the output of the light detection circuit changes between the first level and the second level, the electromagnetic coil jitters to vibrate the toy.

2. The interactive system based on light intensity recognition according to claim 1, wherein:
   the LED driving circuit comprises a second transistor, a third resistor and the LED,
   a base of the second transistor is connected to the output of the light detection circuit,
   an emitter of the second transistor is grounded,
   a collector of the second transistor is connected to a cathode of the LED through the third resistor, and
   an anode of the LED is connected to the first power source.

3. The interactive system based on light intensity recognition according to claim 2, wherein the second transistor is an NPN transistor.

4. The interactive system based on light intensity recognition according to claim 2, wherein the first end of the second resistor, the gate of the MOS transistor, and the base of the second transistor are directly connected with the collector of the first transistor.

5. The interactive system based on light intensity recognition according to claim 1, wherein:
the electromagnetic coil driving circuit further comprises a capacitor, and
the capacitor is connected between the first power source and ground.

6. The interactive system based on light intensity recognition according to claim 5, wherein the MOS transistor is an N-type MOS transistor.

7. The interactive system based on light intensity recognition according to claim 1, wherein:
the light detection circuit further comprises a fourth resistor, a fifth resistor and a fourth transistor,
the fourth resistor and the fifth resistor are connected in series between a positive pole and a negative poles of a second power source,
a common terminal of the fourth resistor and the fifth resistor is connected to a base of the fourth transistor,
a collector of the fourth transistor is connected to the cathode of the photodiode,
an emitter of the fourth transistor is connected to the first power source.

8. The interactive system based on light intensity recognition according to claim 7, wherein the fourth transistor is a PNP transistor.

9. The interactive system based on light intensity recognition according to claim 7, wherein the first transistor is an NPN transistor.

10. The interactive system based on light intensity recognition according to claim 7, wherein the collector of the fourth transistor is directly connected to the cathode of the photodiode.

11. The interactive system based on light intensity recognition according to claim 7, wherein the second end of the second resistor, the cathode of the electromagnetic coil, and the emitter of the fourth transistor are directly connected to the first power source.

12. The interactive system based on light intensity recognition according to claim 11, wherein an anode of the LED is directly connected to the first power source.

13. The interactive system based on light intensity recognition according to claim 12, wherein:
the LED driving circuit comprises a second transistor, a third resistor and the LED,
a base of the second transistor is connected to the output of the light detection circuit,
an emitter of the second transistor is grounded, and
a collector of the second transistor is connected to a cathode of the LED through the third resistor.

14. The interactive system based on light intensity recognition according to claim 13, wherein the collector of the fourth transistor is directly connected to the cathode of the photodiode.

15. The interactive system based on light intensity recognition according to claim 1, wherein the first transistor is an NPN transistor.

16. The interactive system based on light intensity recognition according to claim 1, wherein the MOS transistor is an N-type MOS transistor.

17. The interactive system based on light intensity recognition according to claim 1, wherein the first end of the second resistor and the gate of the MOS transistor are directly connected with the collector of the first transistor.

18. The interactive system based on light intensity recognition according to claim 1, wherein a body of the MOS transistor is grounded.

19. The interactive system based on light intensity recognition according to claim 1, wherein the anode of the electromagnetic coil is directly connected to the drain of the MOS transistor.

20. The interactive system based on light intensity recognition according to claim 1, wherein the second end of the second resistor and the cathode of the electromagnetic coil are directly connected to the first power source.

\* \* \* \* \*